No. 851,338. PATENTED APR. 23, 1907.
S. J. BARNHOUSE.
SAFETY CLUTCH FOR AIR BRAKE ANGLE COCKS.
APPLICATION FILED FEB. 8, 1905.
2 SHEETS—SHEET 2.
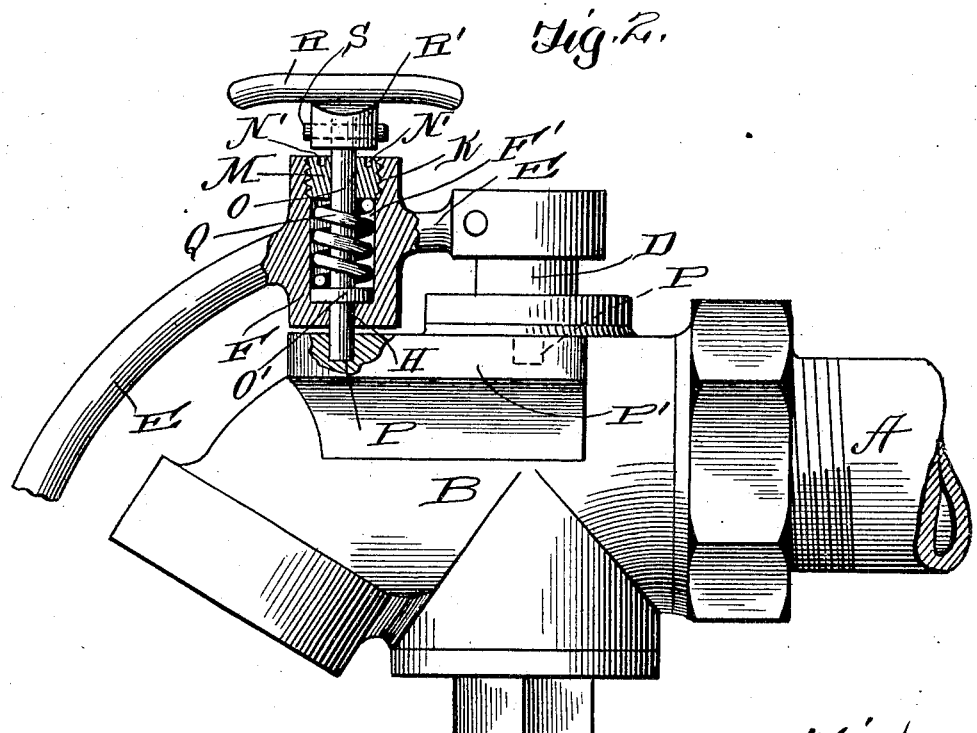
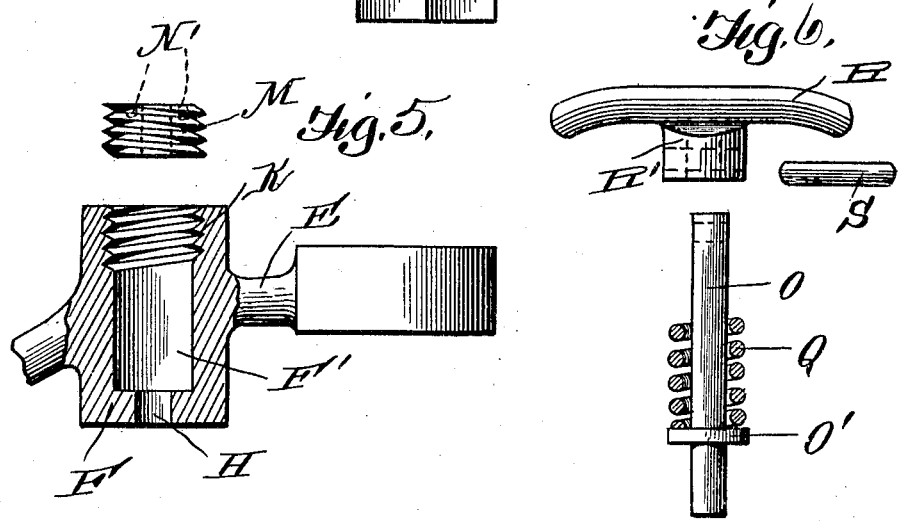
Witnesses
R. A. Boswell.
Nellie A. Mayhew.
Inventor
Sydney J. Barnhouse
By A. L. Hough
Attorney

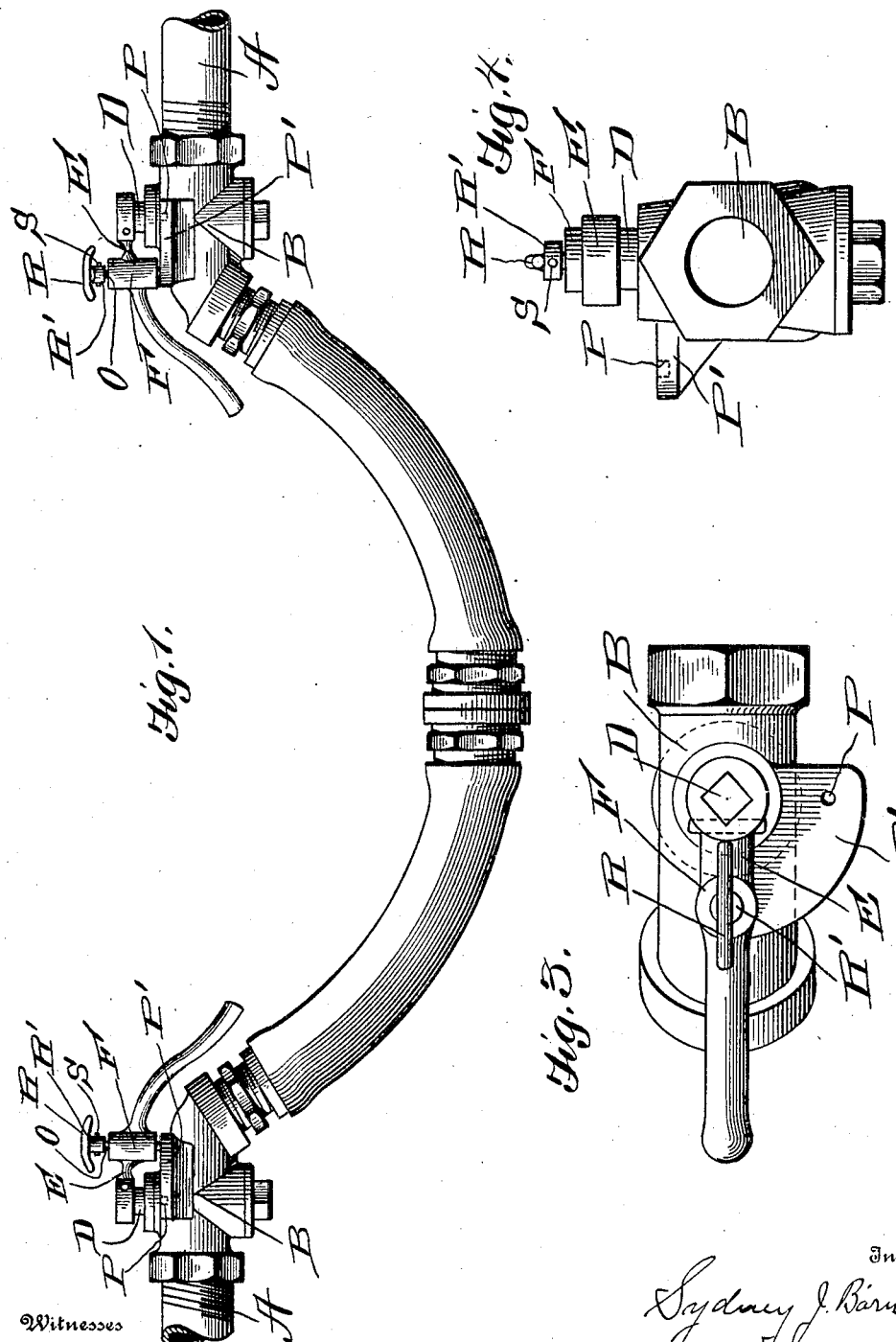

UNITED STATES PATENT OFFICE.

SIDNEY J. BARNHOUSE, OF ALEXANDRIA, VIRGINIA, ASSIGNOR OF ONE-THIRD TO JOHN G. BAYNE, OF ALEXANDRIA, VIRGINIA.

SAFETY-CLUTCH FOR AIR-BRAKE ANGLE-COCKS.

No. 851,338.  Specification of Letters Patent.  Patented April 23, 1907.

Application filed February 8, 1905. Serial No. 244,817.

*To all whom it may concern:*

Be it known that I, SIDNEY J. BARNHOUSE, a citizen of the United States, residing at Alexandria, Virginia, have invented certain new and useful Improvements in Safety-Clutches for Air-Brake Angle-Cocks; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in safety clutch devices for air brake angle cocks, and the object of the invention is to produce a simple and efficient device of this character in which the valve of a fluid pressure pipe may be held securely locked while in an opened or closed relation, thereby avoiding accidental opening or closing of the communication through the pipe.

More essentially the invention consists in a safety locking device of the character described consisting of a valved lever having a chambered portion in which is mounted a threaded plug and through which plug a spring-actuated rod is guided, said rod being adapted to pass through an aperture in the bottom of said chambered part of the lever and engage slots in the casing of the angle cock, whereby the valve may be locked opened or closed as may be desired.

The invention consists further in various details of construction and combinations and arrangements of parts which will be hereinafter fully described and then specifically defined in the appended claims.

My invention is illustrated in the accompanying drawings, which, with the letters of reference marked thereon, form a part of this application, and in which drawings:—

Figure 1 is a view showing the application of my device to a train pipe. Fig. 2 is an enlarged detail view of an angle cock showing my apparatus in section and as applied thereto. Fig. 3 is a top plan view of the device shown as applied to an angle cock. Fig. 4 is a side elevation showing the casing or table of the angle cock. Fig. 5 is a detail sectional view through the cylindrical chambered portion of the lever showing the threaded plug removed therefrom, and Fig. 6 is an enlarged detail view of the spring-pressed rod and handle for operating the same.

Reference now being had to the details of the drawings by letter, A, A designate sections of a train pipe of the usual construction, to each of which is connected a valve casing B, one end of which is downwardly curved, and contains an angle valve of the usual construction employed in train pipes, each of said valves being provided with a stem D to which a lever E is fitted. Said handle has a cylindrical portion F which is chambered, as at F', with an aperture H leading through the bottom of the chambered portion centrally. The surface of the chambered portion has threads K adapted to receive a threaded plug M which is centrally apertured to receive a rod O. Said rod is provided with a flange O' which is adapted to seat against the bottom of said chambered portion F' to limit its downward throw, and a spring Q rests upon said flange and bears between the latter and the under surface of said plug and is adapted to normally hold the flange seated, as shown in Fig. 2 of the drawings, in which position the lower end of the rod will project through said aperture in the cylindrical portion F of the lever and engage one or the other of the recesses P formed in the table or projecting portion P' which is cast integral with the valve casing. The upper face of the table is flat, and its inner portion gradually widens, to reinforce same. R designates a handle which has a hub portion R' which is apertured to receive the upper end of the rod O, and a pin or key S passes through registering apertures in said rod and hub R' and is adapted to hold the handle upon the rod. Said plug is provided with indentures N' which are provided for the purpose of receiving a spanner whereby the plug may be easily and quickly screwed into the chambered portion F' or removed therefrom.

From the foregoing it will be observed that by the provision of a device embodying the features of my invention, a convenient and efficient means is provided for holding the valve of a train pipe either opened or closed, making it necessary for the operator to first raise the spring-pressed rod from engagement with a recess in said table before it will be possible to open or close the valve as the case may be, thus effectually guarding against accidents which frequently happen by the accidental opening or closing of the valve by any object coming in contact with the lever. By the provision of my safety device for locking the valve as shown, many serious accidents to life and property may be avoided.

While I have shown a particular form of device illustrating the features of my invention, it will be understood that I may vary the details of the device if desired, without in any way departing from the spirit of the invention.

Having thus fully described my invention, what I claim as new and desire to secure by Letters Patent, is:—

A safety locking device for angle cocks upon train pipes comprising a valve casing provided with a horizontally disposed shelving table, the upper edge of which is flat and on a line with the upper edge of the casing, the inner portion of the table gradually widening to reinforce the same, and provided with recesses in its upper surface, one end of the casing being downwardly curved, a valve and valve stem, a handle having an integral ring at one end for engagement with the stem of the valve, said handle provided with an enlarged cylindrical outlined chamber, a threaded plug mounted in the top thereof, a spring-pressed shouldered pin passing through registering apertures in said plug and the bottom of the chambered portion and designed to engage one or the other of the recesses in said table, said handle beyond the chambered portion thereof being curved to conform to the downward curve of the outer portion of the casing, as set forth.

In testimony whereof I hereunto affix my signature in presence of two witnesses.

SIDNEY J. BARNHOUSE.

Witnesses:
A. L. HOUGH,
NELLIE A. MAYHEW.